April 8, 1969          L. H. ENLOE ET AL          3,437,955
PHASE LOCKED LASER OSCILLATOR
Filed Dec. 29, 1964
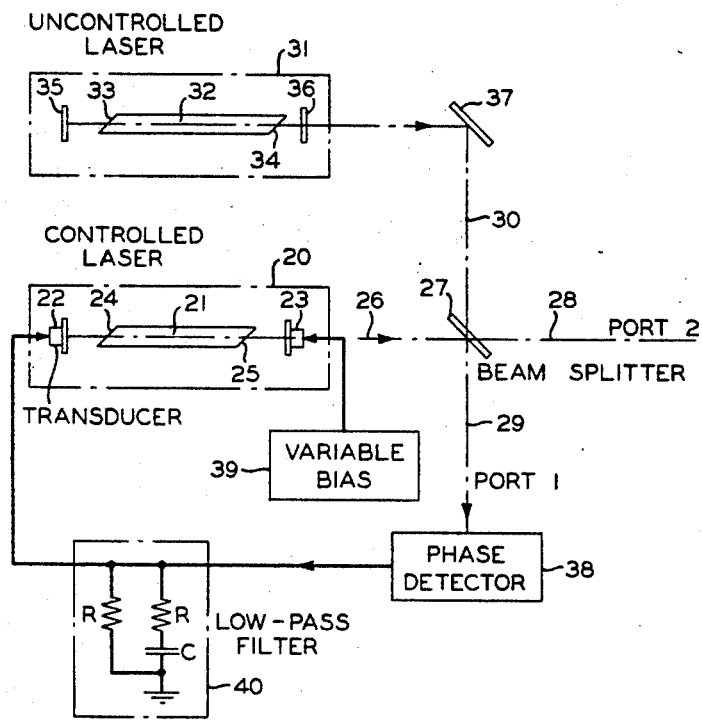
INVENTORS  L. H. ENLOE
           J. L. RODDA II
BY
Kenneth W. Mateer
ATTORNEY

United States Patent Office 3,437,955
Patented Apr. 8, 1969

---

3,437,955
PHASE LOCKED LASER OSCILLATOR
Louis H. Enloe, Marlboro, and John L. Rodda 2nd, Middletown, N.J., assignors to Bell Telephone Laboratories, Incorporated, New York, N.Y., a corporation of New York
Filed Dec. 29, 1964, Ser. No. 421,774
Int. Cl. H01s 3/10; H04b 9/00
U.S. Cl. 331—94.5                                    4 Claims

ABSTRACT OF THE DISCLOSURE

In the apparatus disclosed, one laser oscillator is phase-locked to another laser oscillator by feeding back a phase-sensitive signal to tune the first laser oscillator. The phase-sensitive signal is derived from a detecting device, such as a photomultiplier, which is subject to outputs from both oscillators. The phase-sensitive signal is passed through a low-pass filter in the closed loop of the first laser oscillator and its feedback path and then is applied to control the optical pathlength in the first oscillator.

---

This invention relates to optical masers and, more particularly, to apparatus for generating a light wave which bears a prescribed relationship in frequency and phase to a light wave originating from a different source.

The development of optical masers, or lasers as they are now commonly known, has made possible the generation and amplification of coherent and highly monochromatic electromagnetic wave energy in the optical frequency range, which range is intended for the purpose of this description to extend from the farthest infrared to beyond the ultra-violet. Lasers operable in the optical frequency range typically comprise an optical cavity resonator in which there is disposed an appropriate active medium. Devices of this type employing a cavity resonator formed by a pair of spaced parallel reflectors are disclosed in United States Patent 2,929,922, issued Mar. 22, 1960, to A. L. Schawlow and C. H. Townes. Resonators of this and other types are analyzed in Bell System Technical Journal articles by Fox and Li, vol. 40, page 453; by Boyd and Gordon, vol. 40, page 489; and by Boyd and Kogelnik, vol. 41, page 1347.

In order that the physical structures be practical, the dimensions of optical resonators used in lasers are of the order of thousands of times larger than the wavelengths generated therein. Such resonators are, therefore, multimode. That is, they are capable of supporting a plurality of modes at distinct but closely spaced optical frequencies as well as modes which, while of a single frequency, differ in their propagation direction. In general, the mode structure of optical resonators is strongly dependent on the cavity geometry and dimensions. Thus the typical output of cavity lasers is subject to frequency variations resulting from mechanical, thermal, and other environmental fluctuations and changes.

Many actual and potential applications of the laser are of the type which makes use of the unique bandwidth and frequency characteristics of the optical output. Furthermore, in optical communication systems employing the tremendous information carrying capacity of laser beams, it is desirable that efficient detection techniques be available.

Of known detection techniques, homodyne detection is particularly satisfactory. One attractive aspect of homodyne detection is its requirement of a received signal wave power level which is one-half that required in a heterodyne system, for example. However, this technique depends on the local generation at the receiver of a wave which matches in frequency and phase the carrier wave generated at the transmitter. At optical frequencies, apparatus for realizing such a locally generated wave was not heretofore available.

It is, therefore, the object of the present invention to generate an optical maser wave which is substantially identical to a given optical maser wave.

It is a further object of the invention to lock in frequency and phase the outputs of two lasers, of which one may be at a distance.

A further object is to realize the advantages of optical homodyne detection.

One important aspect of the invention is its provision of two or more laser sources which can be operated to simulate a single source having their combined powers.

An additional advantageous aspect of the invention is the provision of separate identical laser sources, thereby permitting experimental studies of the interaction of light.

The above objects and advantages are realized in an embodiment of the invention in which a laser beam from a first laser and a laser beam from a second or local laser are combined on a photodetector, the resulting difference signal being manipulated and used to control the frequency and phase of the locally generated beam.

More specifically, in the illustrative embodiment, the controlled optical maser oscillator is a single frequency helium-neon laser, the output of which is combined via a beam splitter with the received laser beam on the surface of a photomultiplier. The local oscillator includes a control member whereby its frequency and phase are controllable. It may be necessary to adjust this control initially independently of the first laser beam to ensure that the frequency of the second laser is within the loop tracking range, typically a band of a hundred kilocycles per second. When the laser frequencies are within the tracking range, the controlled laser frequency is brought to that of the first laser with a phase difference, $\varphi$, and the output of the photomultiplier consists of a D-C term plus an error term proportional to sin $\varphi$. If $\varphi$ is small, sin $\varphi = \varphi$, and the error voltage is proportional to phase difference. The error voltage is fed back through a low pass filter to the control member, which voltage causes the frequency of the second laser oscillator to change in a direction which tends to decrease the phase error. In the present invention, the instantaneous magnitude of the phase error, $|\varphi|$, remains smaller than 90 degrees.

The above and other objects of the invention, together with its various features and advantages, will become more readily apparent upon consideration of the accompanying drawing showing in schematic form an illustrative embodiment of the invention, and the detailed description thereof which follows.

More particularly, the drawing shows an arrangement whereby a second laser beam is generated which is locked in frequency and phase to an applied first laser beam. The second or controlled signal is generated in laser 20, which comprises an active medium 21, such as a helium-neon mixture, disposed within a cavity defined by reflectors 22, 23. To minimize reflections and to polarize the laser beam, the ends 24 and 25 of medium 21 are inclined at the Brewster angle. A D-C power source (not shown) would be associated with the active medium for supplying the power necessary to produce and maintain a population inversion, or negative temperature, therewithin. It is to be understood that other means of obtaining poulation inversion, such as R-F excitation, and other active media, such as noble gases and solid materials such as ruby can be used.

The reflectors 22, 23 can have plane surfaces, curved surfaces, or a combination of one plane surface and one curved surface. One of the mirrors is typically partially transmissive and permits abstraction of wave energy from the cavity for external utilization. For a detailed discussion of lasers, see the article by A. Yariv and J. P. Gordon, entitled "The Laser," published in the January 1963 issue of the Proceedings of the Institute of Radio Engineers.

The output from laser 20 propagates along axis 26 toward beam splitter 27, which advantageously is a half-silvered plate disposed at an angle to axis 26, or some other power dividing arrangement. At beam splitter 27, one-half of the incident power is transmitted therethrough along axis 28 (port 2), and one-half is reflected downward along axis 29 (port 1).

Simultaneously incident at beam splitter 27 along axis 30 is a first laser beam originating at a laser generator 31, which is separate and independent from laser 20. Typically, laser 31 is uncontrolled in frequency and phase with respect to laser 20 and can be distant therefrom. For example, in a laser communication system, laser 31 would be situated at a given transmission terminal and laser 20 would be situated at the succeeding receiving terminal, which may be miles away. The distant beam would be typically modulated with signal information, and a carrier wave plus sidebands would be transmitted. At the receiver, the carrier would be reproduced in accordance with the invention. In the present example, laser 31 is similar to laser 20 and comprises an active medium 32 of a helium-neon mixture contained within an envelope having Brewster angle ends 33, 34, the medium being disposed within an optical cavity defined by mirrors 35, 36. The beam from laser 31 is transmitted through mirror 36 and is properly oriented by reflecting mirror 37 to form a beam propagating along axis 30.

Upon incidence on beam splitter 27, the beam from laser 31 is also divided into two equal portions, one-half being reflected along axis 28 and one-half being transmitted along axis 29. Thus, both beams propagate simultaneously along axis 29 and are together incident on phase detector 38.

Detector 38 can be any photodetecting means which produces an electrical current in an external circuit in response to incident optical radiation. Thus, detector 38 can be a photomultiplier, the output current of which is proportional to the instantaneous power of the combined light waves striking the photomultiplier surface. The current increases when the two light waves interfere constructively and decreases when the waves interfere destructively. Thus, the value of the instantaneous current depends upon the phase difference between the beams and the voltage output of photomultiplier 38 is voltage proportional to this difference, i.e., an error voltage. For purposes of the present invention, a photomultiplier manufactured by Radio Corporation of America, and designated No. 7265 is suitable as detector 38.

The error voltage passes through a low pass filter 40 and is applied to a piezoelectric transducer on which mirror 22 of controlled laser 20 is disposed. The low pass filter can comprise, for example, a series RC branch to ground potential bridged by a resistor $R_1$. As the error voltage varies, the piezoelectric transducer dimensions change in well known fashion, thereby causing the cavity length and, hence, the frequency of the controlled laser oscillator to change in a direction decreasing the phase error.

The frequencies of the controlled and uncontrolled lasers are brought initially within the loop tracking range through adjustment of variable bias 39. Once this condition is attained, automatic frequency control action equates the frequencies.

Measurements made on phase locked lasers in a controlled environment have produced sufficient refinement of the parameters involved to permit phase locked laser performance in uncontrolled environments. Specific parameters used in an experimental arrangement were: two helium-neon lasers operating at 6328 A.; a photomultiplier sensitivity of 100 volts/radian; a piezoelectric transducer sensitivity of 0.6 mc./volt; and a low pass filter having a real pole at 40 c.p.s. and a real zero at 50 kc. s. Such a filter can be realized in the embodiment described by selecting $R=160$ ohms, $C=0.02$ microfarad, and $R_1=200K$ ohms.

In all cases, it is understood that the above-described arrangement is merely illustrative of the principles of the present invention. Other embodiments can be devised in accordance with these principles by those skilled in the art without departing from the spirit and scope of the invention.

Thus, for example, the control means associated with the second laser can comprise a phase shifting medium such as a potassium dihydrogen phosphate (KDP) crystal disposed within the laser cavity. The generated error voltage, applied to the KDP crystal, provides the desired phase control of the controlled laser.

In addition, the 3 db power loss at port 2 of the described arrangement can be eliminated by disposing a second phase detector at port 2, the output thereof being combined with the output from detector 38 in a differential amplifier before being fed into low pass filter 40.

It is also possible, in accordance with the invention, to generate an optical maser beam which bears a fixed difference in frequency, with a phase variation less than 90 degrees, to a given independent laser beam. Such a result is produced by providing a second phase detector disposed between the photomultiplier 38 and the low pass filter 40. In such an arrangement, an oscillator signal of the desired frequency difference between the controlled and uncontrolled lasers is applied to the second detector. The second detector output, an error voltage proportional to the departure of the controlled signal from the desired condition, passes through the filter to the control means associated with the controlled laser.

In all embodiments of the invention, amplifying means can be provided in the feedback loop to provide any necessary elevated drive voltages for the control means associated with the controlled laser.

What is claimed is:
1. In combination, means for receiving a first optical maser beam of given frequency and phase characteristic,
   means supplying a second optical maser beam of controllable frequency and phase,
   means for deriving from said first and second beams an error signal having an amplitude proportional to the instantaneous phase difference between said first and second beams,
   means for controlling the frequency and phase of said second optical maser beam,
   and means including a low pass filter for applying said error signal to said controlling means,
   and said controlling means comprises a piezoelectric device upon which one reflective extremity of said cavity is mounted.
2. Means for duplicating a first laser beam of a given frequency and phase comprising
   a source of said beam,
   a second laser having an output beam,
   said laser having frequency and phase control means associated therewith,
   means for combining said first beam and said output beam to produce an error signal proportional to the phase difference between said beams,
   and means including a low pass filter for applying said error signal to said frequency and phase control means.
3. In combination,
   a source of a first optical maser signal,
   means for directing said first optical signal to an optical phase detector,
   a source of a second optical maser signal comprising an active medium disposed within an optical cavity having first and second reflective extremities,
   means for directing said second optical maser signal to said optical phase detector,
   a low pass filter, means for passing the output of said phase detector through said filter to produce a control signal,
and means for applying said control signal to said first extremity,
said first extremity comprising a reflective surface disposed upon a medium whose physical dimensions vary in response to the magnitude of said control signal.

4. In combination,
means for receiving a first optical maser beam,
means for supplying a second optical maser beam, including
    signal-responsive means for controlling frequency and phase of said second beam,
means for detecting said first and second beams simultaneously, and
means coupled from said detecting means to said controlling means for applying to said controlling means an error signal that is responsive to the relative phases of said beams, said error-signal applying means including
    a low pass filter having a real zero at a frequency that is less than frequency width of the initial tracking range for said first and second beams.

References Cited

McDermott, J. R.: Transmitters and Receivers for Optical Communications, Space/Aeronautics, vol. 39 (June 1963) pp. 98–106.

JEWELL H. PEDERSEN, *Primary Examiner.*

WILLIAM L. SIKES, *Assistant Examiner.*

U.S. Cl. X.R.

250—199